US008297160B2

(12) United States Patent
Friesen et al.

(10) Patent No.: US 8,297,160 B2
(45) Date of Patent: Oct. 30, 2012

(54) HYBRID TOWEL DISPENSER

(75) Inventors: Matthew Friesen, Surrey (CA); John Friesen, Vancouver (CA); Brad Friesen, Vancouver (CA); Andrew Jackman, Langley (CA); Alex Trampolski, Richmond (CA)

(73) Assignee: Dispensing Dynamics International Ltd., Surrey (CA)

( * ) Notice: Subject to any disclaimer, the term of this patent is extended or adjusted under 35 U.S.C. 154(b) by 147 days.

(21) Appl. No.: 12/355,491

(22) Filed: Jan. 16, 2009

(65) Prior Publication Data

US 2009/0206101 A1 Aug. 20, 2009

Related U.S. Application Data

(63) Continuation of application No. 11/423,100, filed on Jun. 8, 2006, now Pat. No. 8,082,827, which is a continuation-in-part of application No. 11/245,585, filed on Oct. 7, 2005, now abandoned.

(30) Foreign Application Priority Data

Apr. 3, 2006 (CA) ...................................... 2541645

(51) Int. Cl.
*B23D 25/02* (2006.01)
*B26D 7/00* (2006.01)

(52) U.S. Cl. ............................................ 83/649; 83/337

(58) Field of Classification Search .................... 83/337, 83/649

See application file for complete search history.

(56) References Cited

U.S. PATENT DOCUMENTS

| | | | | |
|---|---|---|---|---|
| 3,055,471 | A * | 9/1962 | Warn et al. | 192/45 |
| 3,702,096 | A | 11/1972 | Copeland | 95/89 R |
| 3,737,087 | A | 6/1973 | Rooklyn | |
| 4,438,836 | A * | 3/1984 | Kagata | 192/36 |
| 4,569,467 | A | 2/1986 | Kaminstein | |
| 4,666,099 | A | 5/1987 | Hoffman et al. | |
| 4,738,176 | A * | 4/1988 | Cassia | 83/208 |

(Continued)

FOREIGN PATENT DOCUMENTS

CA 1263348 A1 11/1989

(Continued)

OTHER PUBLICATIONS

Friesen et al., "Hybrid Towel Dispenser," Office Action mailed Oct. 1, 2009, for U.S. Appl. No. 11/423,100, 14 pages.

(Continued)

*Primary Examiner* — Ghassem Alie
*Assistant Examiner* — Bharat C Patel
(74) *Attorney, Agent, or Firm* — Seed IP Law Group PLLC

(57) ABSTRACT

A hybrid towel dispenser is provided that is operable in an automatic dispensing mode and a manual dispensing mode. The paper towel dispenser comprises: a rotatable drum that advances a paper towel sheet applied on the drum when the drum rotates; a one-way rotational coupling; a motor coupled to the drum by the one-way rotational coupling and automatically operable to rotate the drum; and a manual advance assembly coupled to the drum and manually operable by a user to rotate the drum. The one-way rotational coupling couples the motor to the drum such that the motor drives the drum in a first direction and does not drive the drum when the manual advance assembly is operated to rotate the drum in the first direction.

16 Claims, 19 Drawing Sheets

U.S. PATENT DOCUMENTS

| | | | | | |
|---|---|---|---|---|---|
| 4,796,825 | A | | 1/1989 | Hawkins | |
| 4,846,412 | A | | 7/1989 | Morand | 242/55.3 |
| 4,960,248 | A | * | 10/1990 | Bauer et al. | 242/564.4 |
| 5,031,258 | A | | 7/1991 | Shaw | |
| 5,287,832 | A | | 2/1994 | Uhl | 123/185.3 |
| 5,413,426 | A | | 5/1995 | Ijuin et al. | |
| 5,441,189 | A | | 8/1995 | Formon et al. | |
| 5,452,832 | A | | 9/1995 | Niada | |
| 5,772,291 | A | | 6/1998 | Byrd et al. | |
| 5,924,617 | A | | 7/1999 | LaCount et al. | |
| 5,979,284 | A | | 11/1999 | Granger | |
| 5,979,625 | A | * | 11/1999 | Kinoshita et al. | 192/41 R |
| 6,079,305 | A | | 6/2000 | Bloch et al. | |
| 6,105,898 | A | | 8/2000 | Byrd et al. | |
| 6,112,631 | A | | 9/2000 | VanAlstine | 83/589 |
| 6,196,102 | B1 | | 3/2001 | Granger | |
| 6,206,322 | B1 | * | 3/2001 | Elliott et al. | 242/564.2 |
| 6,250,530 | B1 | * | 6/2001 | LaCount et al. | 225/10 |
| 6,293,486 | B1 | | 9/2001 | Byrd et al. | |
| 6,314,850 | B1 | | 11/2001 | Morand | |
| 6,374,791 | B1 | | 4/2002 | Kuwabara et al. | 123/179.25 |
| 6,412,655 | B1 | | 7/2002 | Stuetzel et al. | |
| 6,412,679 | B2 | | 7/2002 | Formon et al. | |
| 6,419,136 | B2 | | 7/2002 | Formon et al. | |
| 6,446,901 | B1 | | 9/2002 | Haen et al. | |
| 6,460,798 | B1 | | 10/2002 | Haen et al. | |
| 6,553,879 | B2 | | 4/2003 | Morand | |
| 6,592,067 | B2 | | 7/2003 | Denen et al. | |
| 6,695,246 | B1 | | 2/2004 | Elliott et al. | |
| 6,698,681 | B1 | | 3/2004 | Guy et al. | |
| 6,742,689 | B2 | | 6/2004 | Formon et al. | |
| 6,745,927 | B2 | | 6/2004 | Formon et al. | |
| 6,779,640 | B2 | | 8/2004 | Tomita | |
| 6,793,758 | B2 | | 9/2004 | Erickson et al. | |
| 6,820,785 | B2 | | 11/2004 | Kapiloff | |
| 6,851,593 | B2 | | 2/2005 | Weber et al. | |
| 6,854,684 | B2 | | 2/2005 | Byrd et al. | |
| 6,871,735 | B2 | * | 3/2005 | Kawai et al. | 192/38 |
| 6,892,620 | B2 | * | 5/2005 | Kapiloff | 83/649 |
| 6,903,654 | B2 | | 6/2005 | Hansen et al. | |
| 7,040,566 | B1 | * | 5/2006 | Rodrian et al. | 242/563 |
| 7,114,677 | B2 | | 10/2006 | Formon et al. | |
| 7,168,602 | B2 | | 1/2007 | Broehl | |
| 7,234,381 | B2 | | 6/2007 | Granger | |
| 7,255,337 | B2 | | 8/2007 | Wakabayashi et al. | |
| 7,341,170 | B2 | | 3/2008 | Boone | |
| 2001/0045149 | A1 | | 11/2001 | Granger | |
| 2002/0113109 | A1 | | 8/2002 | Gracyalny et al. | |
| 2003/0164079 | A1 | * | 9/2003 | Budz et al. | 83/649 |
| 2003/0167893 | A1 | | 9/2003 | Morris et al. | |
| 2003/0168549 | A1 | | 9/2003 | Formon et al. | |
| 2003/0168550 | A1 | | 9/2003 | Formon et al. | |
| 2003/0197086 | A1 | | 10/2003 | Denen et al. | |
| 2003/0224888 | A1 | | 12/2003 | Wilder et al. | |
| 2004/0041057 | A1 | | 3/2004 | Byrd et al. | |
| 2004/0135027 | A1 | | 7/2004 | Elliott et al. | |
| 2004/0178297 | A1 | | 9/2004 | Moody et al. | |
| 2004/0251375 | A1 | | 12/2004 | Denen et al. | |
| 2005/0051005 | A1 | * | 3/2005 | Broehl | 83/13 |
| 2005/0072874 | A1 | | 4/2005 | Denen et al. | |
| 2005/0127232 | A1 | | 6/2005 | Moody et al. | |
| 2005/0145745 | A1 | | 7/2005 | Lewis et al. | |
| 2005/0150992 | A1 | | 7/2005 | Morris et al. | |
| 2006/0006275 | A1 | | 1/2006 | Neveu et al. | |
| 2007/0068353 | A1 | | 3/2007 | Piucci et al. | |

FOREIGN PATENT DOCUMENTS

| | | | |
|---|---|---|---|
| CA | 2246357 | A1 | 8/1997 |
| CA | 2332911 | A1 | 11/1999 |
| CA | 2342260 | A1 | 9/2001 |
| CA | 2413197 | A1 | 1/2002 |
| CA | 2370828 | A1 | 8/2002 |
| CA | 2370835 | A1 | 8/2002 |
| CA | 2372117 | A1 | 8/2002 |
| CA | 2469030 | A1 | 7/2003 |
| CA | 2469032 | A1 | 7/2003 |
| EP | 0629372 | A1 | 12/1994 |
| JP | 60144262 | A | 7/1985 |
| JP | 2295526 | A | 12/1990 |
| JP | 2001218695 | A | 8/2001 |
| WO | 9724970 | A1 | 7/1997 |

OTHER PUBLICATIONS

Friesen et al., "Automated Toilet Paper Dispenser," Office Action mailed Nov. 2, 2009, for U.S. Appl. No. 11/553,919, 21 pages.
"Bearing," www.dictionary.com, retrieved Mar. 27, 2008, 2 pages.
"Coupling," www.dictionary.com, retrieved Mar. 27, 2008, 2 pages.

* cited by examiner

HYBRID TOWEL DISPENSER

CROSS-REFERENCE TO RELATED APPLICATIONS

This application is a continuation of U.S. application Ser. No. 11/423,100 filed on Jun. 8, 2006, and which is continuation-in-part of U.S. application Ser. No. 11/245,585 filed on Oct. 7, 2005, both of which are incorporated herein by reference in its entirety and for all teachings, disclosures and purposes. This application also claims Convention priority from Canadian application 2,541,645 entitled "Hybrid Towel Dispenser" and filed on Apr. 3, 2006.

BACKGROUND

1. Technical Field

This invention relates generally to towel dispensers and particularly to away-from-home type paper towel dispensers.

2. Description of the Related Art

Different types of single-use paper towel dispensers are available for the away-from-home market. For example, folded paper towel dispensers contain a stack of folded individual paper towel segments that are dispensed through a slot. Other dispensers dispense paper towel segments from a tightly wound paper roll. Such dispensers can dispense paper towel segments from perforated or continuous paper rolls. Perforated roll dispensers contain a continuous paper roll with longitudinally-spaced, transversely-extending perforations that define individual paper towel segments. In continuous roll dispensers, a continuous paper roll is cut into individual segments by a cutting device located in the dispenser.

There are continuous roll dispensers which require a user to manually sever a paper segment from the continuous roll by pulling the paper against a serrated cutting blade. Such dispensers cannot control the length of the paper segment dispensed, and are thus susceptible to paper wastage. Another type of continuous roll dispenser is known as a portion control dispenser, which automatically cuts the paper roll into paper towel segments as the paper is being dispensed from the dispenser. In one type of portion control dispenser, the paper roll is rotatably mounted inside the dispenser and a leading edge of the paper is fed through a cutting roller and out of the dispenser through a slot. The paper is advanced manually by a user operating a paper advance mechanism or pulling on the leading edge of the paper roll. When the paper advances through the dispenser, the cutting roller rotates and a knife in the cutting roller extends radially outwards and punctures the paper, thereby severing a paper towel segment from the roll. The dispenser is designed to cut the paper into segments of defined length and only one at a time, thereby reducing paper wastage.

The continuous roll dispenser can be a "hands-free" (touchless) type, i.e. designed to dispense paper towel segments without requiring the user to touch any part of the dispenser other than the leading edge of the paper roll. Such a design is particularly desirable as the user is not exposed to germs or contaminants on other parts of the dispenser.

Hands-free dispensers can be manually operated or motorized. Motorized hands-free dispensers typically have a proximity or motion sensor that detects a user's hand or hand movement. When the sensor detects a user, a motor inside the dispenser is activated. The motor is coupled to the paper roll and advances a paper segment out of the dispenser. Examples of such motorized hands-free dispensers are disclosed in U.S. Pat. Nos. 5,772,291, 6,412,679, 6,695,246, 6,892,620, and 6,903,654. All of the dispensers disclosed in these patents require the user to manually sever a segment from the paper roll by applying the paper surface against a cutting knife, or as in the case of U.S. Pat. No. 6,412,679, tear a segment from a perforated paper towel roll. In other words, there are no known paper towel dispensers that automatically advance and cut paper towel segments.

One problem with known motorized paper towel dispensers is that such dispensers are rendered inoperable when the motor fails or when the batteries die. Also, such dispensers do not allow the user to withdraw paper from the dispenser at a rate faster than the rate at which the paper is being automatically advanced. Impatient users may become frustrated while waiting for the paper to be dispensed, or worse, may damage the dispenser by pulling on the paper towel as it is being dispensed. Therefore, it would be desirable to provide an automated hands-free towel dispenser that solves at least some of these problems.

BRIEF SUMMARY

It is a general objective of the invention to provide an automated hands-free towel dispenser that solves at least some of the problems in present towel dispensers. A particular objective of the invention is to provide an improved hands-free towel dispenser that can automatically advance and cut a paper towel segment for the user. A further objective of the invention is to provide a paper towel dispenser that can operate in both an automated dispensing mode and a manual dispensing mode.

According to one aspect of the invention, there is provided a towel dispenser comprising: a rotatable drum having a retractable knife that extends out of the drum when the drum rotates past a selected position; a motor coupled to the drum and operable to rotate the drum; and a paper guide that guides a towel sheet onto the drum such that rotation of the drum past the selected position advances a portion of the towel sheet out of the dispenser and severs the portion from the towel sheet. This dispenser is thus particularly useful for automatically dispensing a towel sheet portion to the user without the user having to manually tear the portion from the towel sheet. The towel dispenser can further comprise a sensor for detecting a user, a controller communicative with the sensor and motor and programmed to activate the motor when the sensor detects a user and automatically dispense the towel sheet portion.

The dispenser can further comprise a one-way coupling which couples the motor to the drum in a first direction (drive direction) and decouples the motor in an opposite second direction, thereby enabling the motor to rotate the drum in an automatic dispensing mode and a user to rotate the drum in a manual dispensing mode. Example of such couplings include one-way bearings, one-way clutches, and floating ratchets. Such a dispenser is particularly useful when power is unavailable to the motor, as the user can still operate the dispenser in the manual dispensing mode. The user can rotate the drum in a hands-on manual dispensing mode by engaging a manual advance assembly that is rotationally coupled to the cutting drum. The manual advance assembly can comprise a push bar or a rotary dial coupled to the cutting drum; the user pushes the push bar or rotates the dial to manually rotate the cutting drum and operate the manual advance assembly. Therefore, even if the manual advance assembly is used (push bar or dial) or the user manually pulls the sheet from the dispenser, the cutting drum will rotate and knife will extend to produce a cut sheet portion.

The drum can further comprise a cam assembly coupling the knife to the drum such that rotation of the drum from the start position to the selected position extends the knife out of the drum. The drum can further comprise a spring that is unloaded when the drum is in a start position and loaded when the drum is in the selected position. The spring stores sufficient energy when loaded to rotate the drum from the selected position back to the start position; in this sense, the selected position is the drum's top dead center position. The dispenser can further comprise a motor-off switch that is communicative with the controller. The controller is programmed to stop the motor when the motor-off switch detects the drum passing the top dead center position; the drum returns back to the start position by the release of spring energy.

A DC power supply can be electrically coupled to the motor. This power supply can include at least one battery. Or, the power supply can comprise an electrical connector for connecting to an external AC power outlet, and an inverter electrically coupled to the electrical connector and to the motor.

According to another aspect of the invention, there is provided a towel dispenser comprising: a rotatable roller drum; a motor coupled to the roller drum and operable to rotate the drum; a paper guide that guides a towel sheet onto the roller drum such that rotation of the roller drum advances a portion of the towel sheet out of the dispenser; and, a one-way rotational coupling which couples the motor to the drum in a first direction and decouples the motor from the drum in an opposite second direction, thereby enabling the motor to rotate the drum in an automatic dispensing mode and a user to rotate the drum in a manual dispensing mode.

According to yet another aspect of the invention, there is provided a paper towel dispenser comprising: a rotatable drum that advances a paper towel sheet applied on the drum when the drum rotates; a one-way rotational coupling; a motor coupled to the drum by the one-way rotational coupling and automatically operable to rotate the drum; and a manual advance assembly coupled to the drum and manually operable by a user to rotate the drum. The one-way rotational coupling couples the motor to the drum such that the motor drives the drum in a first direction and does not drive the drum when the manual advance assembly is operated to rotate the drum in the first direction.

DETAILED DESCRIPTION

Directional terms such as "top", "bottom", "right", and "left" are used in this description merely to aid in describing the embodiments of the invention and are not to be construed as limiting the embodiments to any particular orientation during operation or in connection to another apparatus.

Figure 1:
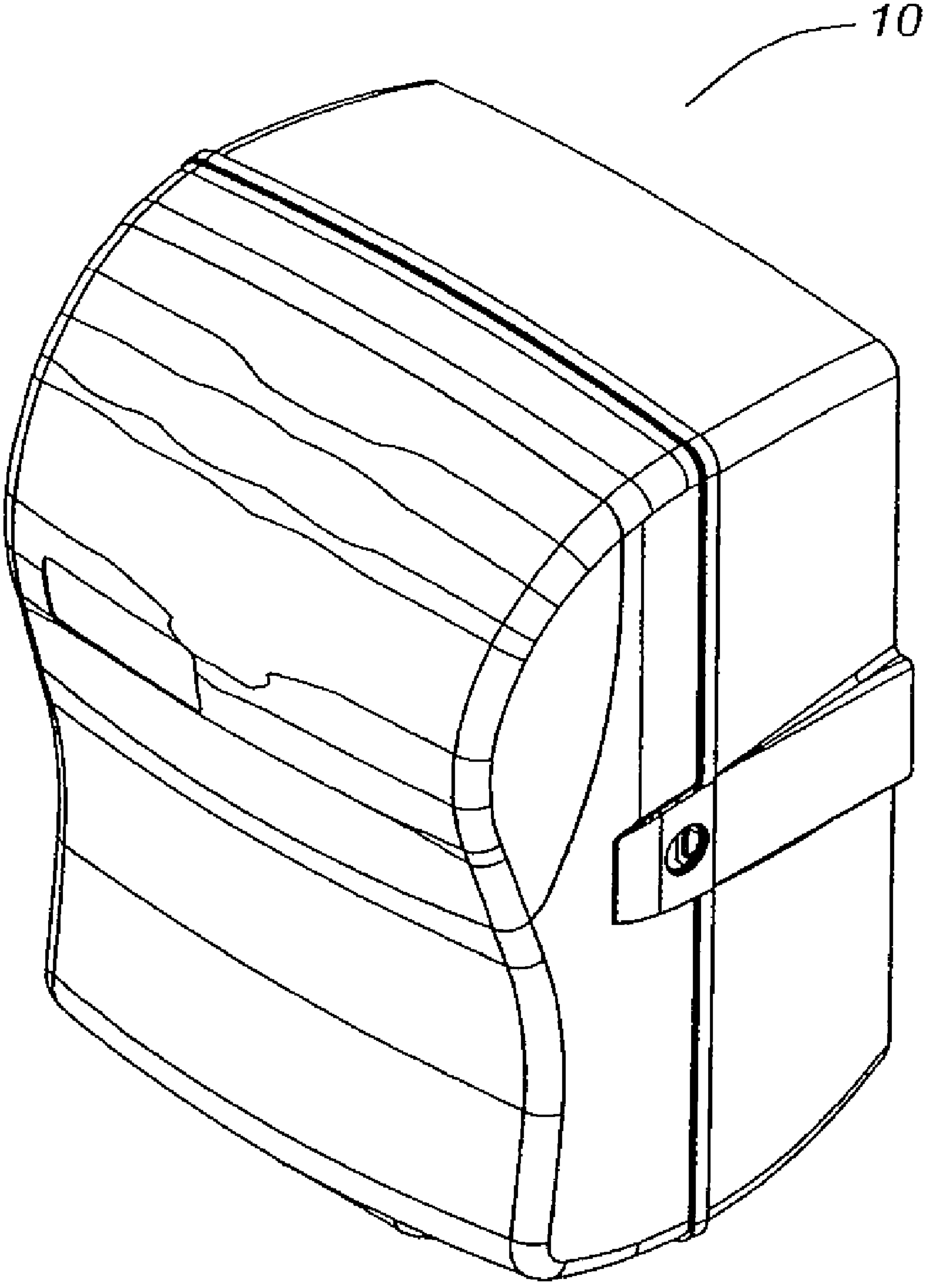
FIG. 1 is a perspective view of a hands-free paper towel dispenser according to one embodiment of the invention.

According to one embodiment of the invention and referring to FIG. 1, a hands-free paper towel dispenser 10 is provided for dispensing paper towel segments. The dispenser 10 can operate in an automatic hands-free mode wherein the dispenser 10 detects the presence of a user and automatically dispenses a paper towel segment. The dispenser 10 can also operate in a manual hands-free mode wherein the user can, by pulling on the leading edge of a paper towel segment, cause the dispenser to dispense the paper towel segment. Further, the dispenser can also operate in a manual hands-on mode wherein the user can cause the dispenser to dispenser the paper towel segment by operating a manual advance assembly on the dispenser. In addition, the dispenser 10 is provided with a manual override mechanism that enables the user to manually operate the dispenser even while the dispenser is automatically dispensing the paper towel segment. In this sense, the dispenser 10 is a "hybrid dispenser" which can operate in different manual and automatic modes.

Figure 2:
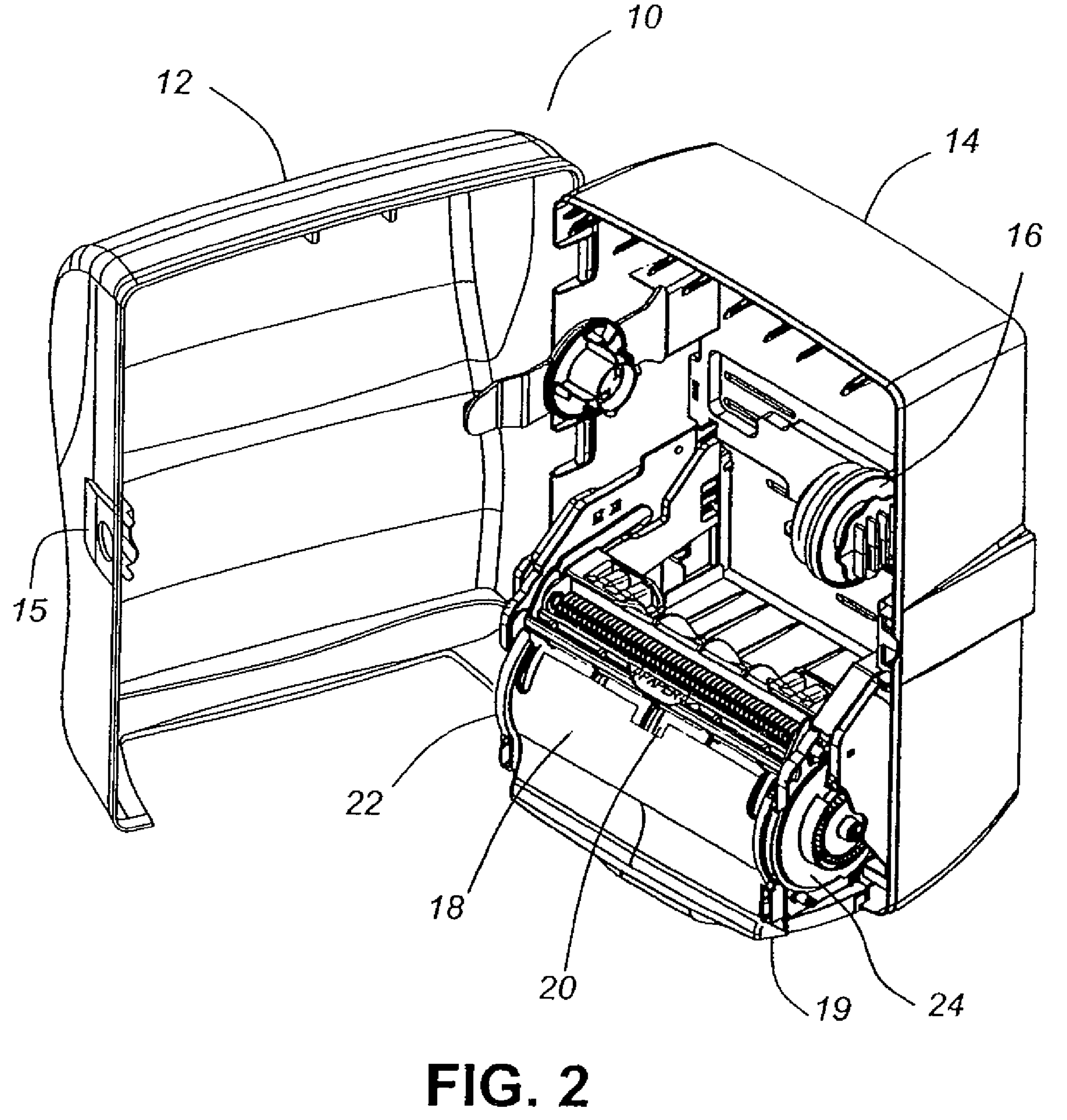
FIG. 2 is a perspective view of the dispenser with its front housing opened.
Figure 3:
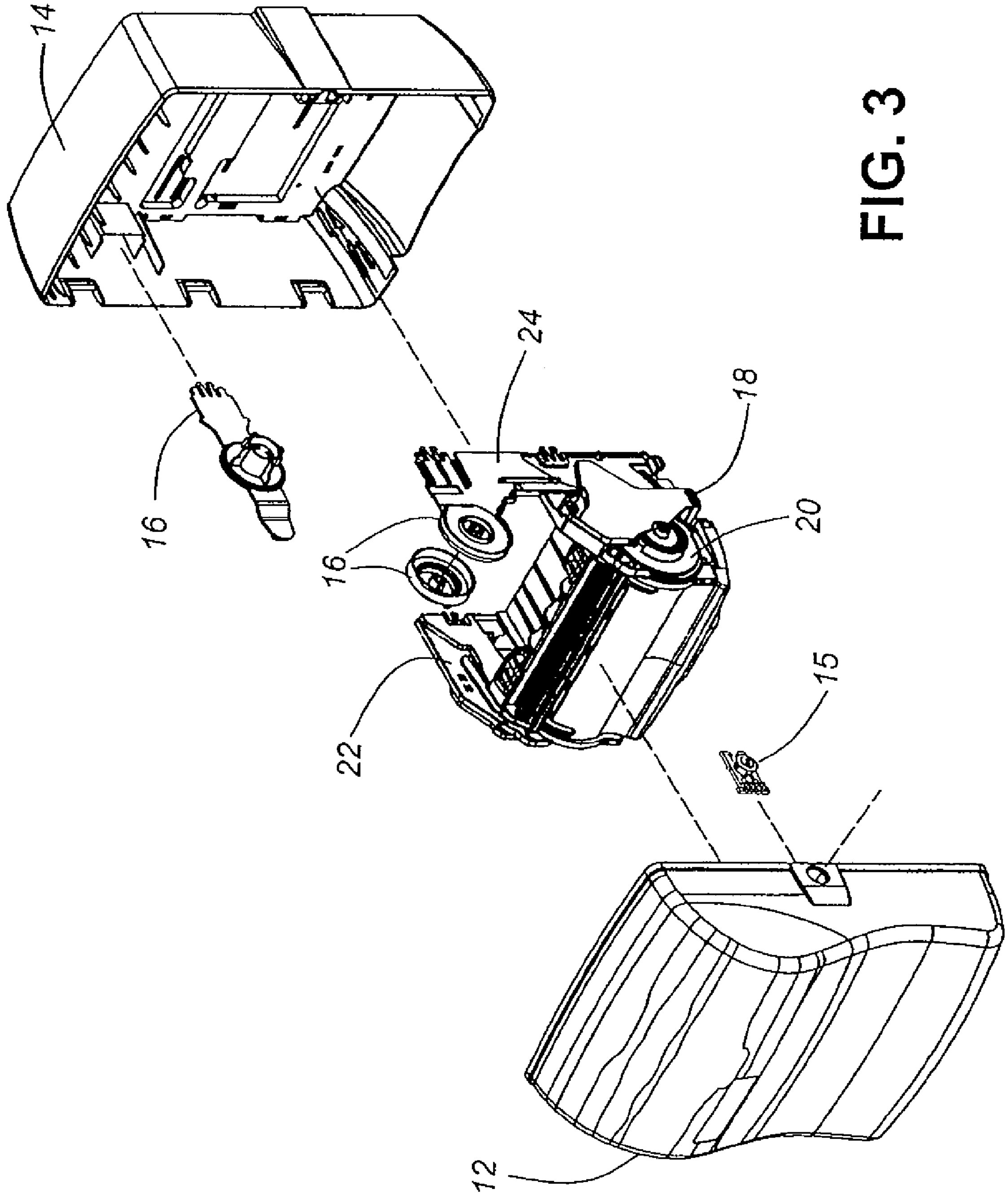
FIG. 3 is a perspective, partially disassembled view of the dispenser, illustrating the front and back housings and internal components in assembled form.

Referring to FIGS. 2 and 3, the dispenser 10 has a housing comprising a front door 12 and a rear cabinet 14; the door and cabinet 12, 14 are hingedly interconnected, enabling the front door 12 to be swung open to provide access to the internal components of the dispenser 10. A locking mechanism 15 is provided to lock the door and cabinet 12, 14 together. The dispenser 10 dispenses paper towel segments cut from a paper towel roll (not shown) rotatably mounted on a roll holder 16 at an upper portion inside the dispenser 10. The leading edge of a continuous sheet of paper from the paper towel roll is threaded through a roller assembly 18 mounted at a lower portion inside the dispenser 10 and out of the dispenser 10 through a paper dispensing slot 19 at the bottom of the dispenser 10.

Figure 4:
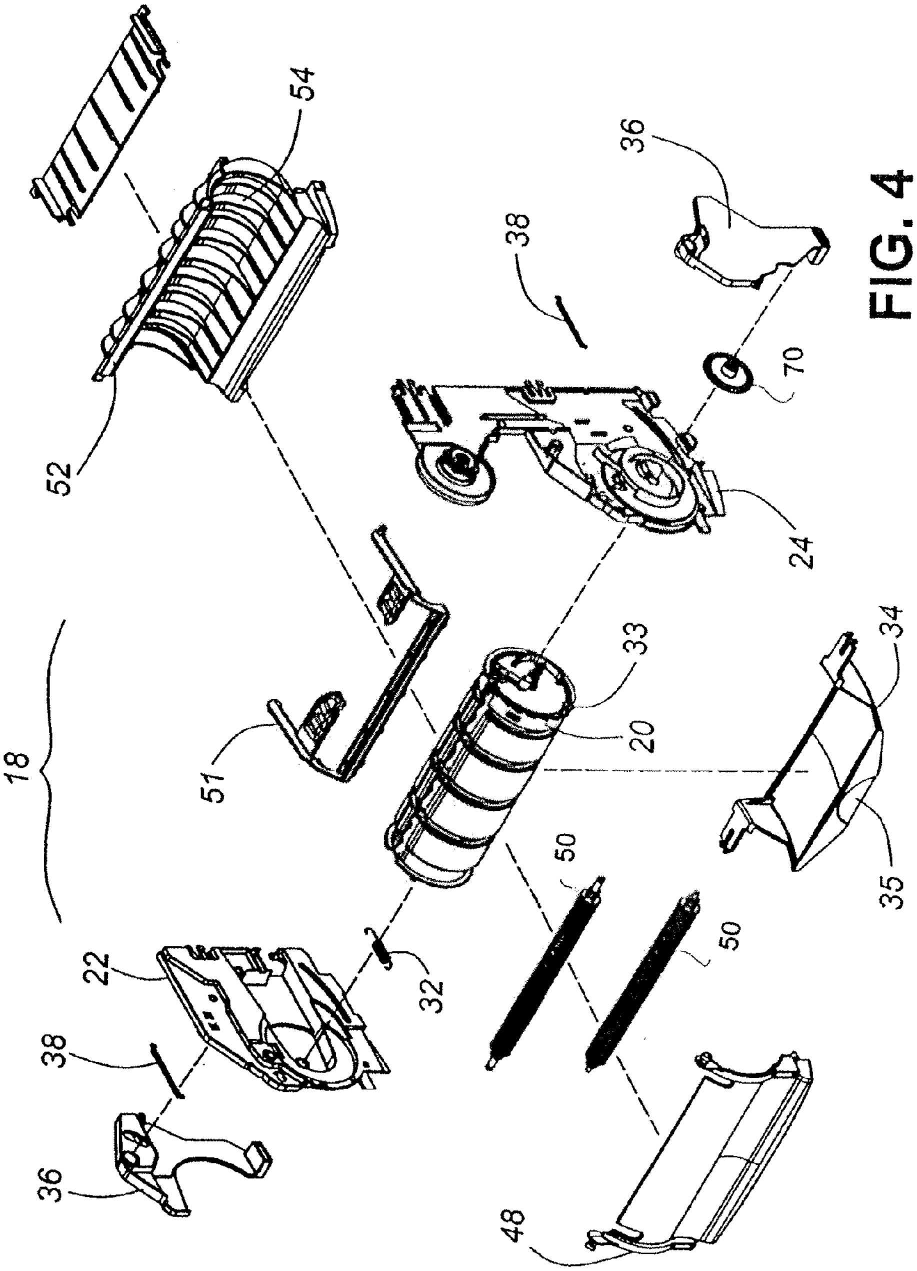
FIG. 4 is a perspective, partially disassembled view of some of the internal components of the dispenser.

Referring to FIG. 4, the roller assembly 18 comprises a number of parts which collectively serve to feed paper from the roll holder 16 to the slot 19, and cut the paper into uniform sized paper towel segments. In particular, the roller assembly 18 comprises a cutting drum 20 rotatably coupled to left and right side panels 22, 24. Paper threaded through the roller assembly 18 contacts part of the drum's surface; the cutting drum 20 operates to advance the paper through the roller assembly 18 and to sever power towel segments from the paper towel roll.

Figure 5:
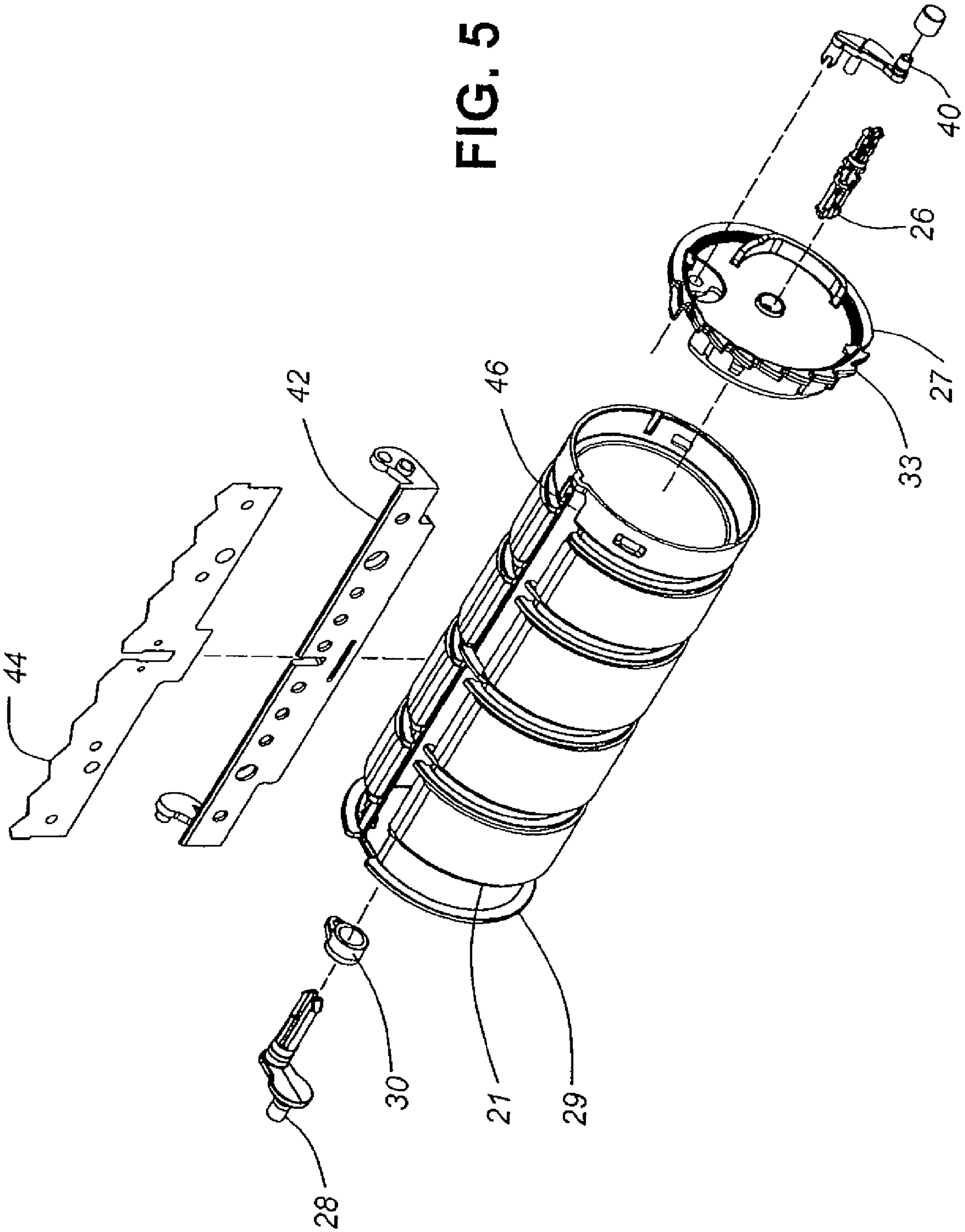
FIG. 5 is a perspective partially disassembled view of a cutting drum assembly of the dispenser.

Referring to both FIGS. 4 and 5, the cutting drum 20 comprises a cylindrical rolling surface 21 and right and left end caps 27, 29. A drum pin 26 is mounted to the right end cap 27 and to the right side panel 24. A crank arm 28 is mounted to a left end cap 29 of the cutting drum 20 and to the left side panel 22. The crank arm 28 includes a crank bushing 30 mounted off the drum axis, and attaches to one end of a return spring 32; the other end of the return spring 32 attaches to the left side panel 22. The return spring 32 serves to rotate the cutting drum 20 enough to advance the leading edge of the paper roll through the slot 19 that the user can easily grasp the paper. Because the crank bushing 30 is mounted off the drum axis, rotation of the drum 20 (e.g. caused by the user pulling on the paper or by a motor 60 coupled to the drum 20) loads up the spring 32 until the spring 32 reaches a top dead center position wherein the spring's longitudinal axis extends through the drum centerline. That is, the spring 32 is unloaded when the drum 20 is in a start position, and is fully loaded when the drum 20 is in the top dead center position. When the spring 32 passes the top-dead center position, the spring 32 releases its stored energy and rotates the drum 20 through the rest of a single revolution and returns the cutting drum 20 back to the start position (as shown FIG. 6(*a*)).

The right end cap 27 includes circumferentially-disposed teeth 33 which engage with a manual advance assembly 34. The manual advance assembly 34 comprises a push button 35 connected at either end to left and right advance levers 36. The right advance lever 36 engages the teeth 33; when a user pushes the push button 35, the lever 36 rotates the cutting drum 20 a circumferential distance proportional to the push stroke. Such manual advance is useful when an insufficient amount of paper extends from the slot 19 or when automatic dispensing operation is unavailable. Manual advance springs 38 serve to return the advance assembly 34 back to its start position.

A knife actuator 40 extends from the right end cap 27 (off-drum axis) and engages a cam path (not shown) located in the right side panel 24. The knife actuator 40 is coupled to a knife holder 42, which holds a saw-tooth cutting knife 44 having multiple teeth that extend across the width of the knife 44. The knife holder 42 is pivotally coupled to the rim of the right and left end caps 27, 29 such that the knife holder 42 and knife 44 can be pivoted between a retracted position inside the cutting drum 20 (see FIG. 6(*a*)), and an extended position wherein the knife extends radially out of the rolling surface 21 through a knife slot 46 (see FIG. 6(*b*)). The knife 44 is fully retracted when the cutting drum 20 is in the start position. Because the cutting drum 20 and knife 44 are located inside the dispenser housing, the user is protected from the knife; this design is particularly safer than those dispensers that require the user to manually sever a sheet portion from the roll by using an exposed or partially exposed knife.

Figure 6A:
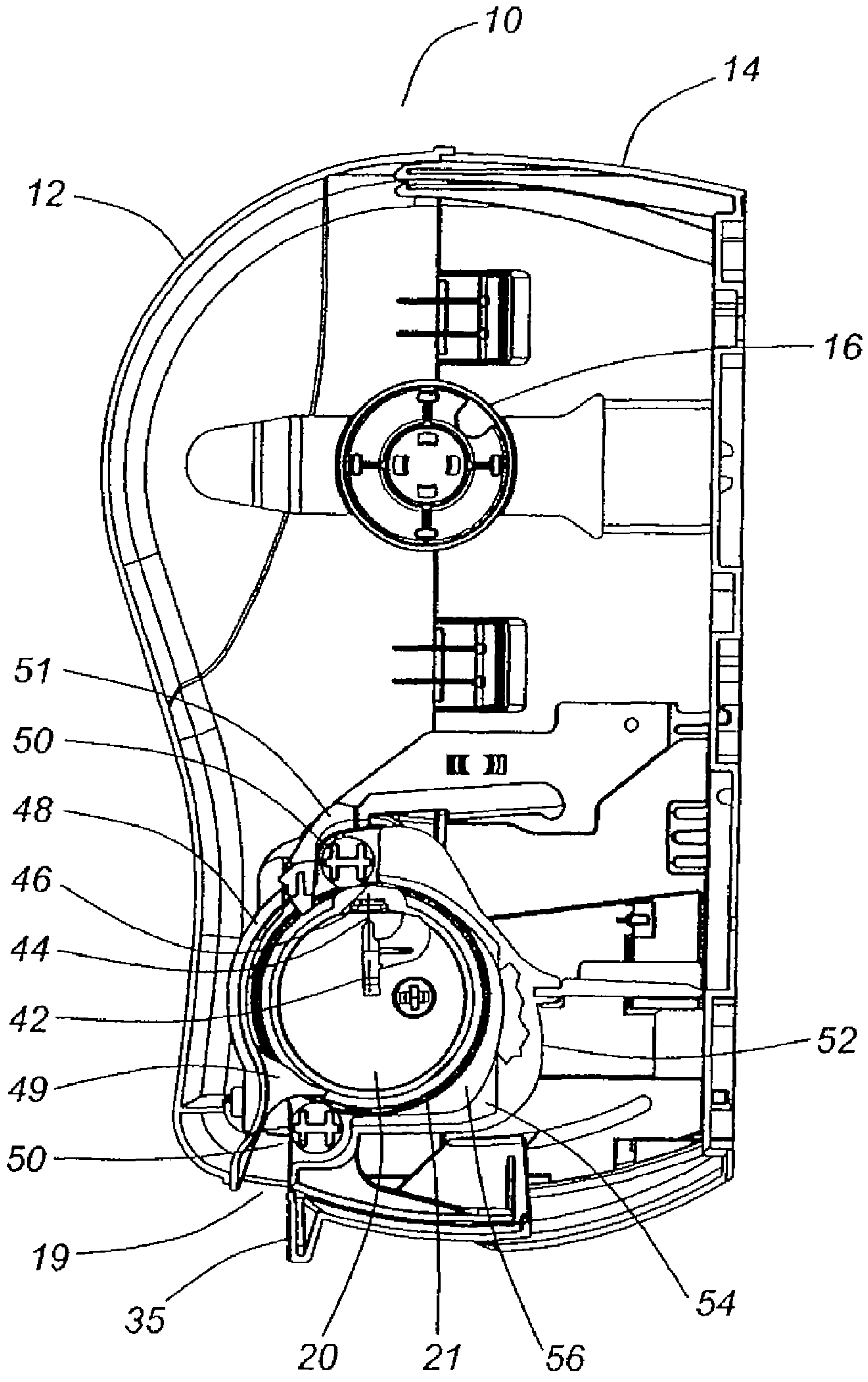
FIGS. 6(*a*) and (*b*) are transparent side views of the dispenser, with the cutting drum in a starting position (FIG. 6(*a*)), and in a cutting position (FIG. 6(*b*).
Figure 6B:
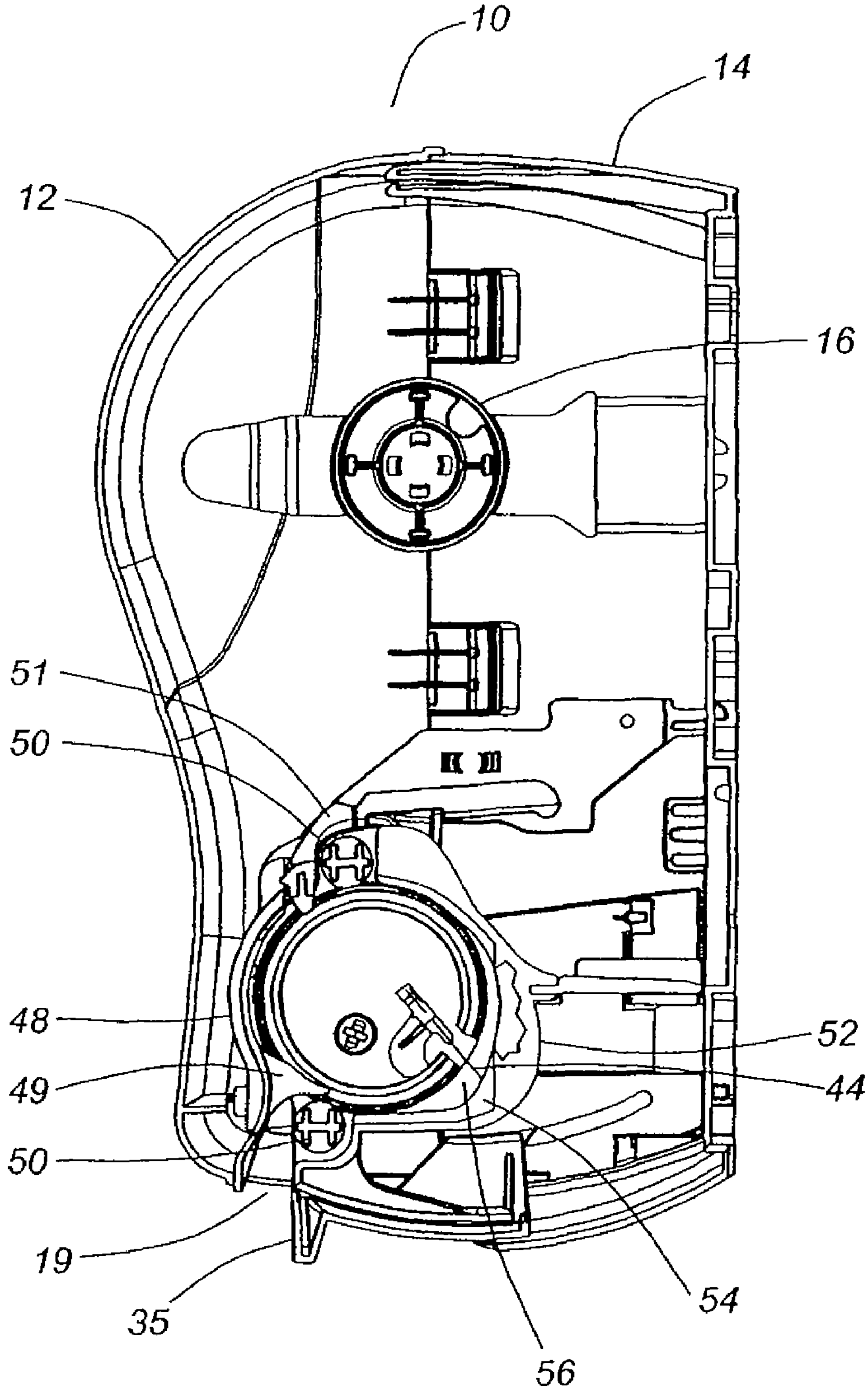

Referring now to FIGS. 4, 6(*a*) and 6(*b*), a front cover 48 is mounted to the left and right side panels 22, 24 in front of the cutting drum 20. The front cover 48 has an inside surface facing the rolling surface 21. Fingers 49 protrude from the inside surface and terminate close to rolling surface 21; the fingers 49 separate the paper from the rolling surface 21 and direct the paper downwards through the slot 19. Top and bottom pinch roller 50 are rotatably mounted to the left and ride side panels 22, 24, and serve to guide the paper into and out of the roller assembly 18. A transfer mechanism 51 is pivotally attached to the left and right panels 22, 24 and serves to transfer paper from a stub roll into the roller assembly 18, in a manner well known in the art.

Figure 7:
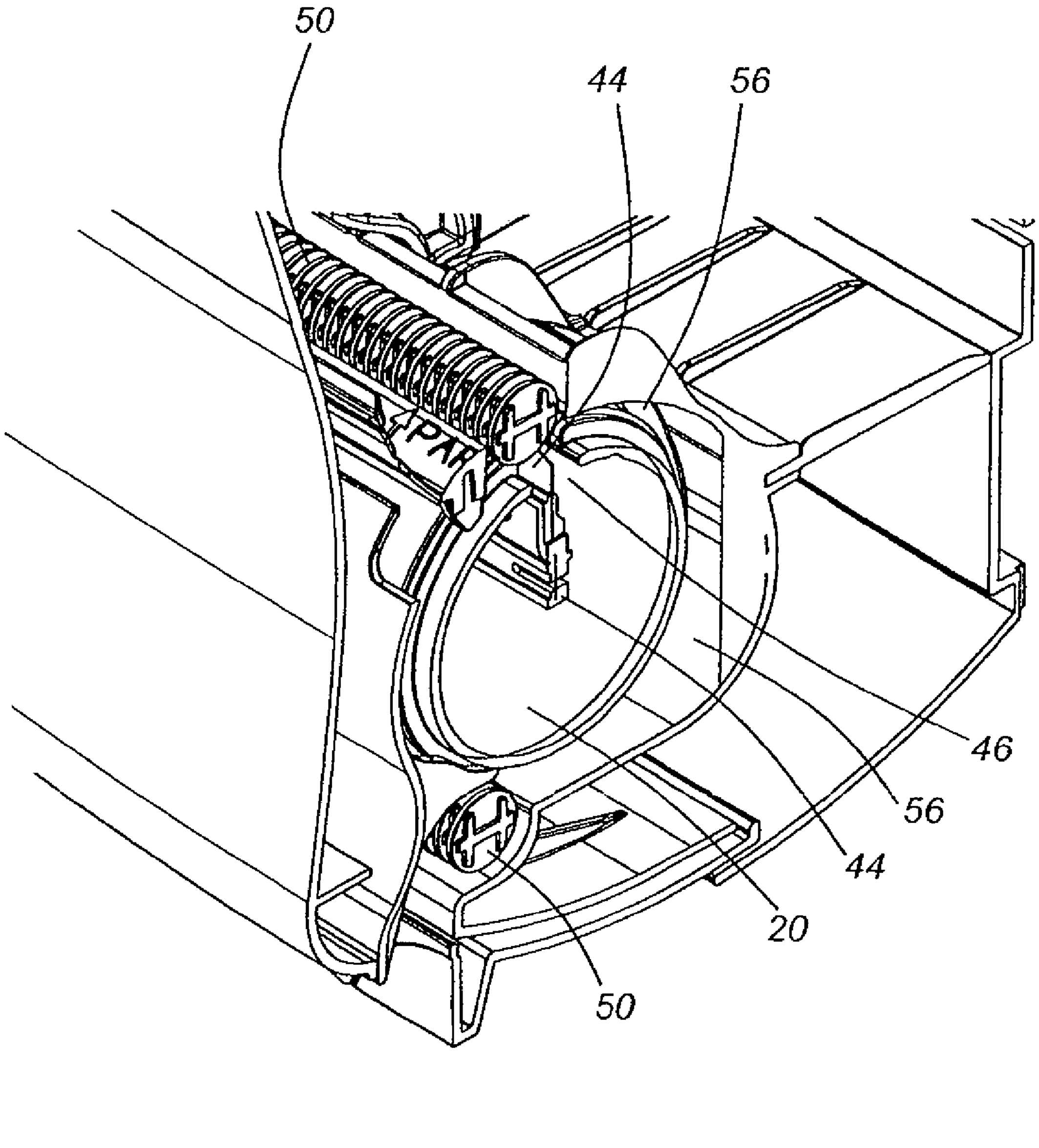
FIG. 7 is a perspective partial view of the cutting drum assembly.

A paper guide 52 is mounted to the left and right side panels 22, 24 behind the cutting drum 20. The paper guide 52 comprising a plurality of ribs 54 facing the rolling surface 21, that serve to keep the paper from "bunching up" between the paper guide 52 and rolling surface 21, and to hold the paper in place for cutting by the cutting knife 44. The ribs 54 are transversely spaced and span the width of the cutting drum 20; the spaces in between the ribs 54 are hereby defined as "rib cavities" 55. The ribs 54 are curved and generally conform to the curvature of the rolling surface 21: The radial spacing between the ribs 54 and rolling surface 21 is at a minimum at the top of the paper guide 52, which is located at the start position of the cutting knife 44 (shown in FIG. 6(*a*)), and hereby referred to as the "0 degree" position. The radial spacing widens to a maximum at around 135 degrees from the start position, then narrows to the minimum at the bottom of the paper guide 52, i.e. at the finish position around 180 degrees from the start position. This spacing between the start and finish positions is hereby referred to as a "cutting zone" 56, and serves to provide sufficient space for the cutting knife 44 to extend out from the cutting drum 20 but insufficient space for the paper to bunch up. When the cutting drum 20 rotates (clockwise in FIGS. 6(*a*) and (*b*)), the knife actuator 40 moves through the cam path, which is configured to cause the knife actuator 40 to pivot and extend the cutting knife 44 through the rolling surface opening 46 when the knife 44 passes through the cutting zone 56 (as shown in FIG. 6(*b*)), and retracts the knife 44 when the cutting drum 20 rotates out of the cutting zone 56 (as shown in FIG. 6(*a*)). The cutting zone 56 is shown in detail in FIG. 7.

Figure 8:
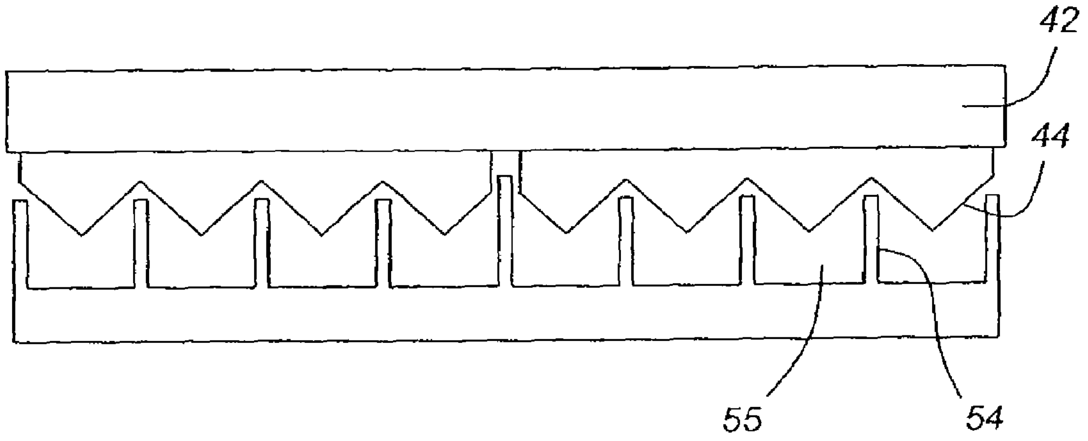
FIG. 8 is a schematic front elevation view of parts of the paper guide and cutting drum assembly, wherein the cutting knife is fully deployed from the drum assembly.

When the cutting knife 44 is fully extended and as shown in FIG. 8, the knife teeth (i.e. the tips of the saw-tooth knife 44) extend between the ribs 54 and into the rib cavities 55 in between the ribs 54, and the ribs 54 extend into the valleys between the knife teeth. In other words, the ribs 54 and knife teeth overlap in the drum's radial direction when the knife 44 is fully extended. Note that the radial extension of the knife 44 is less than the knife's lengthwise extension out of the drum 20, since the knife 44 pivots out of the drum 20 at an angle to the drum's radial direction. This angle increases the further the knife pivots out of the drum 20.

When the knife 44 extends into the cutting zone 56, the knife 44 contacts the paper therein. If the knife 44 is extending with sufficient momentum, the knife teeth will puncture the paper upon contact, and a paper towel segment will be severed from the paper roll. However, if the knife does not extend with sufficient momentum, the knife 44 will not immediately cut the paper upon contact, and the paper will be pushed radially against the ribs 54; as the knife teeth continue to extend, the teeth will puncture the paper (which is being held radially in place by the ribs 54) and the teeth will continue to extend into the rib cavities 55, severing a paper towel segment.

The function of the ribs 54 is particularly important when the user pulls strongly on the paper roll and causes the paper to pass quickly through the rolling assembly 18—in conventional rolling assemblies, the paper tends to become separated from the rolling surface when the paper is pulled strongly, and the knife often fails to completely sever the paper on the first revolution of the rolling drum. The knife 44 will eventually cut through the paper when the rotation of the drum 20 has slowed sufficiently, but uncut "double sheeted" paper towel segments tend to be dispensed. In contrast, the ribs 54 of the dispenser 10 maintain the paper in position for cutting by the cutting knife 44 regardless of how strongly the user pulls the paper roll, thereby resulting in the knife 44 severing the paper into segments in each and every rotation of the cutting drum 20. Additionally, the rotational drag caused by the cutting action is sufficient to slow the rotation of the cutting drum 20 to a stop without the need of a mechanical stopper. For typical-strength pulls on the paper roll, the drag will cause the cutting drum 20 to stop after one full revolution. A particularly strong pull on the paper roll may result in the roller drum 20 rotating twice before stopping; however, the dispenser 10 ensures that a paper towel segment will be cut and dispensed in each revolution, thereby dispensing two paper towel segments instead of one double-sheeted segment. This is preferable over using a mechanical stopper, which tends to be noisy, or allowing the rolling drum and paper roll to free-spin to a stop, which tends to cause paper to un-roll and collect inside the dispenser, increasing the chances of paper jamming.

Advantageously, a cut paper towel segment is provided each time paper is dispensed using the advance lever 36. The drum 20 operates to sever a paper towel segment from the sheet each time the drum 20 completes a revolution; therefore, the user cannot "spool" paper using the advance mechanism.

This embodiment features nine ribs 54 transversely spaced across the width of the cutting roller 20; a corresponding number of knife teeth are provided that cooperate with the rib cavities 55. A different number of ribs and knife teeth can be provided within the scope of the invention so long that there are a sufficient number of ribs to hold the paper in place to ensure that the paper is cut by the knife 44. Also, the depth of the ribs 54 is selected to provide enough radial clearance for the rib cavities to receive the knife teeth.

Furthermore, the width of each rib can be varied within the scope of the invention; for example, the rib width can be increased with the rib cavity width decreased accordingly. The knife teeth widths should also be decreased accordingly to avoid the teeth coming into contact with the ribs.

Figure 9:
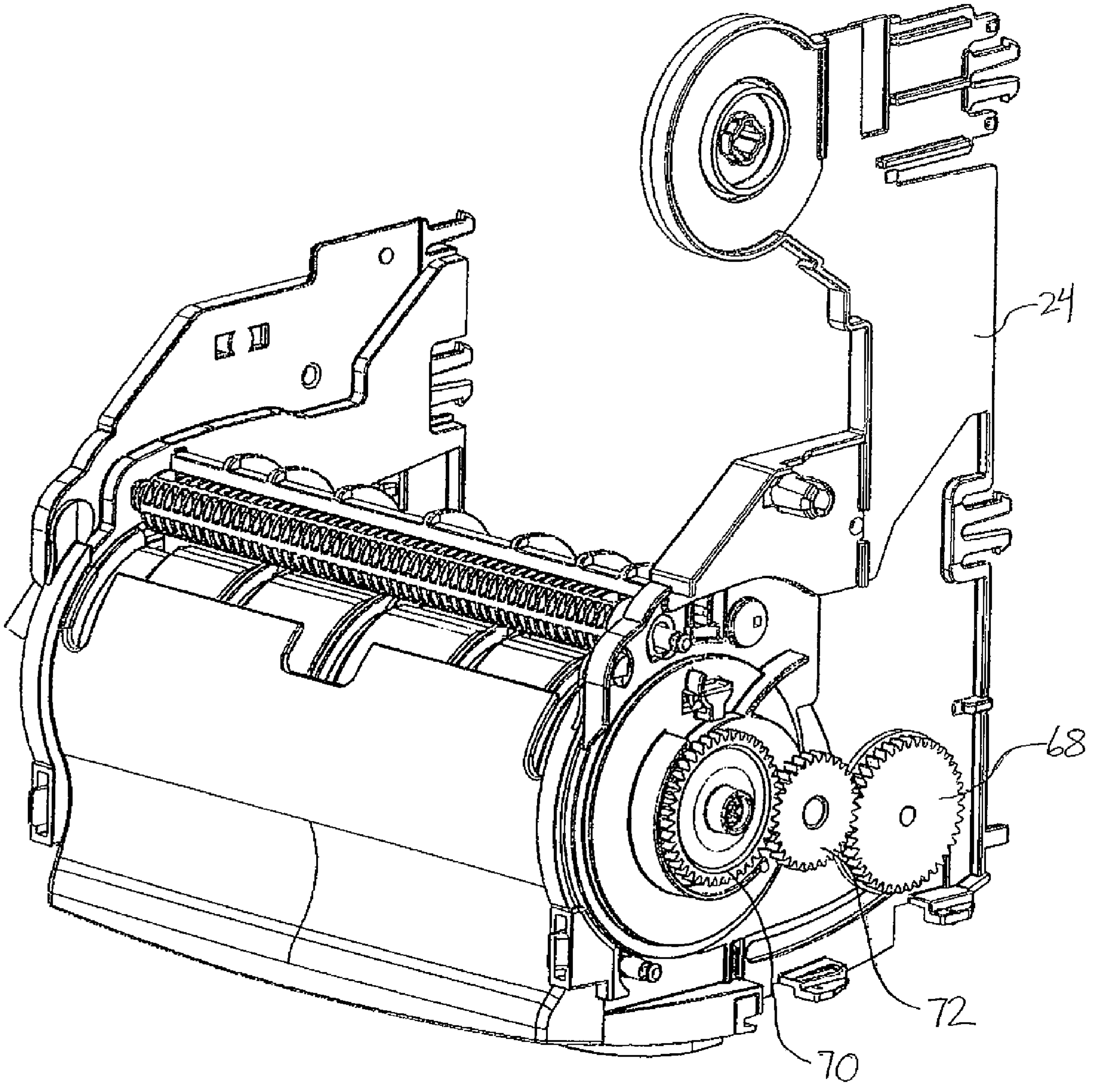
FIG. 9 is a perspective partially disassembled view of the dispenser, illustrating a motor rotatably coupled to the cutting drum assembly.
Figure 10:
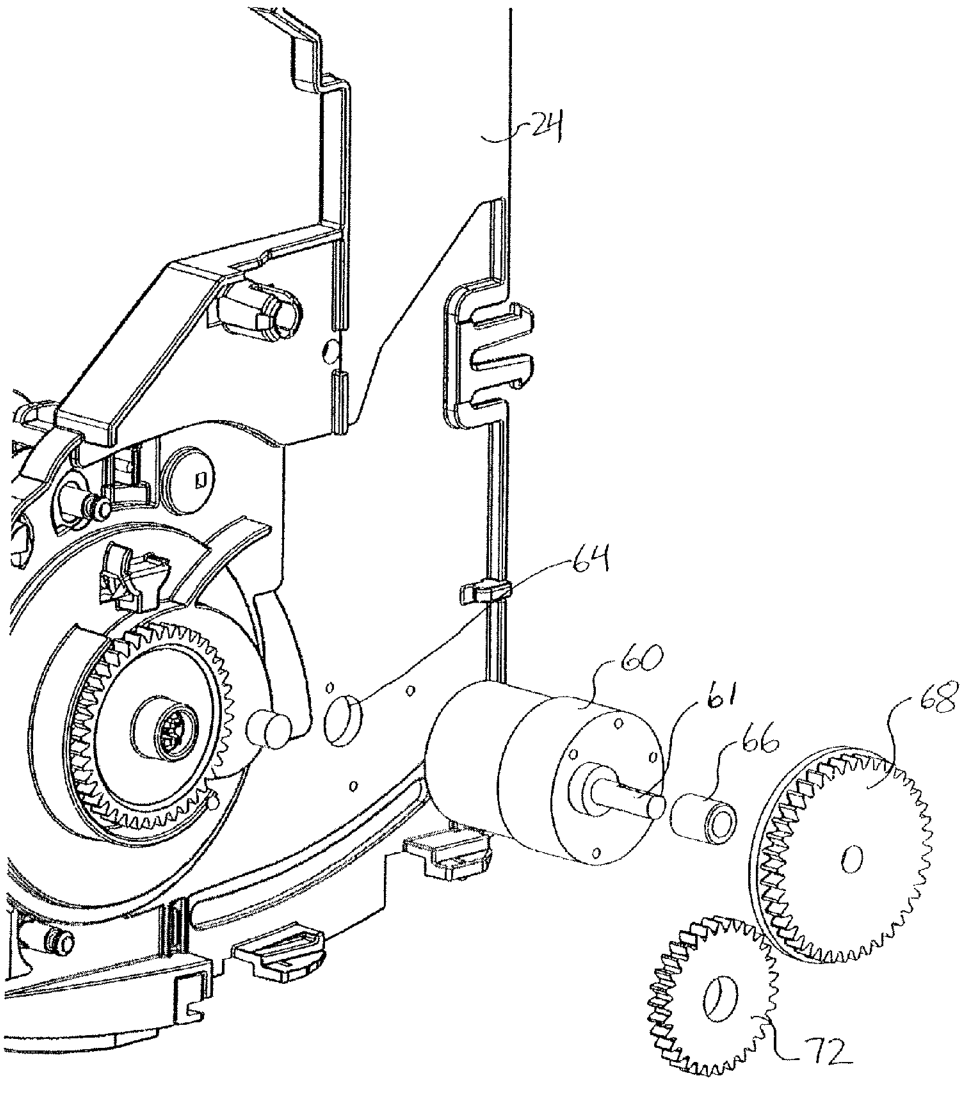
FIG. 10 is a perspective partially disassembled view of the dispenser showing parts of the motor in exploded view.
Figure 11:
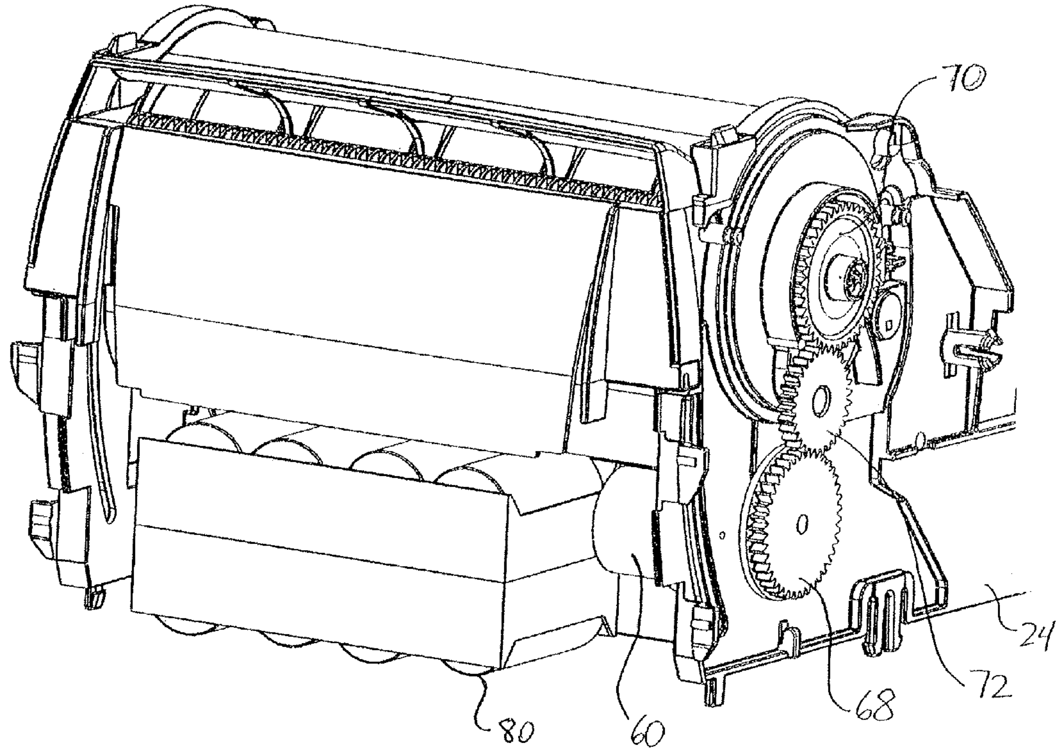
FIG. 11 is a perspective view of the dispenser illustrating the motor and a battery pack.

Paper threaded through the roller assembly 18 contacts part of the drum's surface; tension means inside the roller assembly 18 keep the paper in sufficient tension against the drum's surface that pulling the paper through the roller assembly 18 will cause the cutting drum 20 to rotate. When a user pulls the leading edge of the paper towel roll out of the dispenser 10, the cutting drum 20 is rotated and severs a paper towel segment from the roll. Similarly, rotating the cutting drum 20 will cause the paper to move through the roller assembly 18. Referring now to FIGS. 9 to 11, an electrical motor 60 is rotatably coupled to the cutting drum 20 and can be operated to rotate the cutting drum 20, thereby advancing the paper through the roller assembly 18 and severing the paper towel roll into segments.

The motor 60 is a DC-powered gear head motor mounted on the inside surface of the right side panel 24. A suitable motor is a Jameco Reliapro model 151440 with 4.5-12 VDC operating range and a no load speed of 69 RPM; however, other motors with similar specifications can be readily substituted. The motor 60 has a drive shaft 61 which extends through an opening 64 in the right side panel 24 and connects to the inside surface of a one-way bearing 66. The outside surface of the one-way bearing 66 is in turn coupled to a motor drive gear 68. The motor drive gear 68 is rotatably coupled to a cutting drum drive gear 70 by an intermediate drive gear 72. The cutting drum drive gear 70 is mounted to a shaft (not shown) coupled to the cutting drum 20 and extending along the rotational axis of the cutting drum 20. The drive gears 68 and 72 serve as a reduction gears between the motor 60 and cutting drum 20.

The one-way bearing 66 is aligned to transfer torque from the motor 60 to the cutting drum 20 and yet allow the cutting drum 20 to rotate freely in the drive direction. Therefore, when the motor 60 is not operating, the dispenser 10 can still be operated as a manual hands-free or hands-on dispenser. In other words, a user can pull on the leading edge of the paper towel roll, causing the paper to advance through the roller assembly 18 and rotate the cutting drum 20, thereby causing the cutting drum 20 to sever a paper towel segment from the paper towel roll. Or, the user can cause the dispenser 10 to dispense paper towel segments by activating the manual advance assembly 34. This is particularly useful when power is unavailable to the motor, e.g. power outage or dead batteries. Without such one-way bearing 66, the rotational resistance presented by the reduction gears 68, 72 and motor 60 would make it very difficult to rotate the cutting drum 20. Additionally, the one-way bearing 66 allows the cutting drum 20 to rotate at a faster rate than the rate as driven by the motor 60. This permits a user to manually advance the paper out of the dispenser 10 at a faster rate than is being advanced by the motor 60.

Although the use of a one-way bearing is described here, other one-way rotational couplings as known in the art can be substituted. Other suitable one-way couplings include one-way clutches and one-way ratchets.

Figure 12:
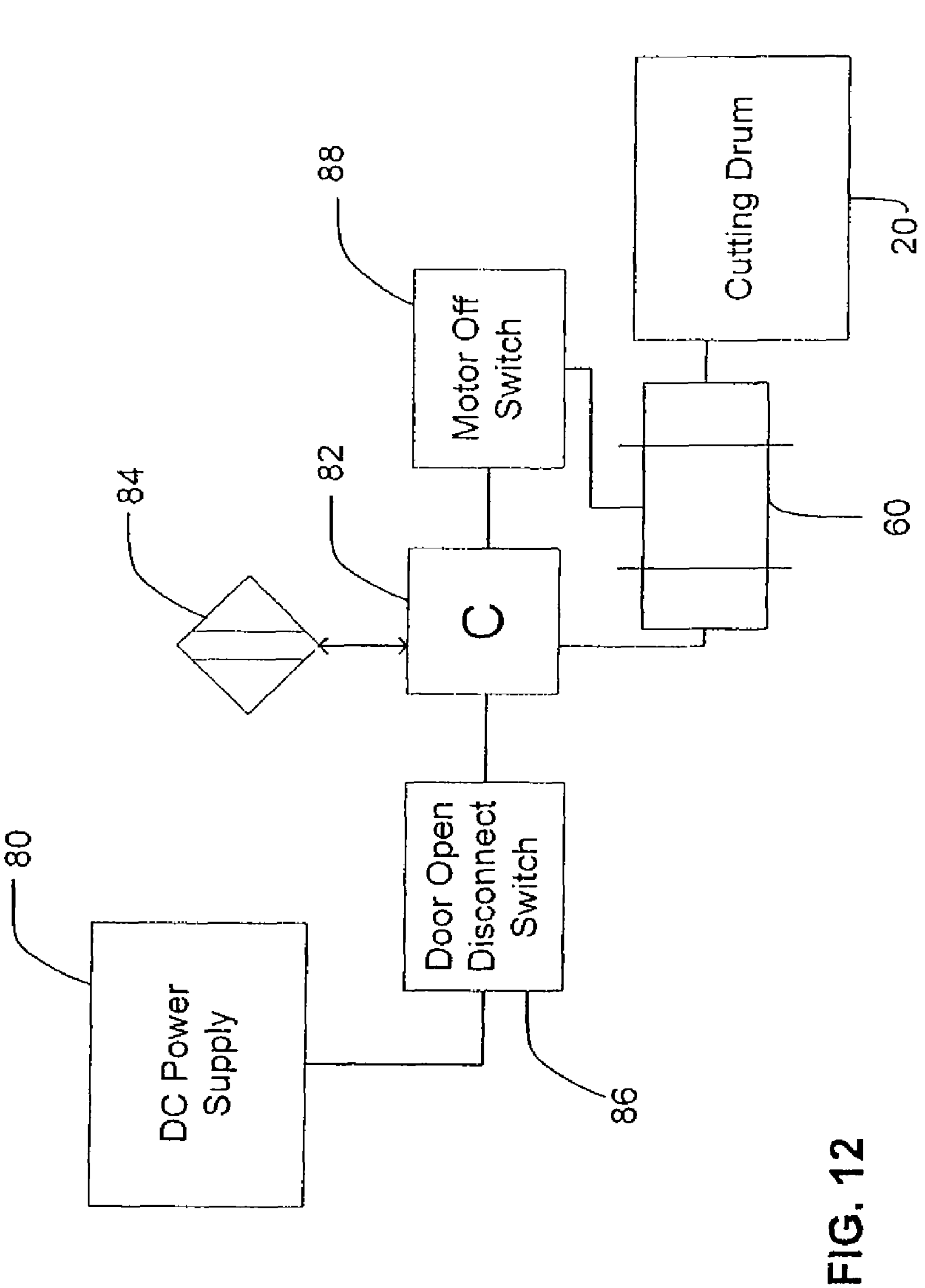
FIG. 12 is a schematic diagram of automatic dispensing components of the dispenser.
Figure 13:
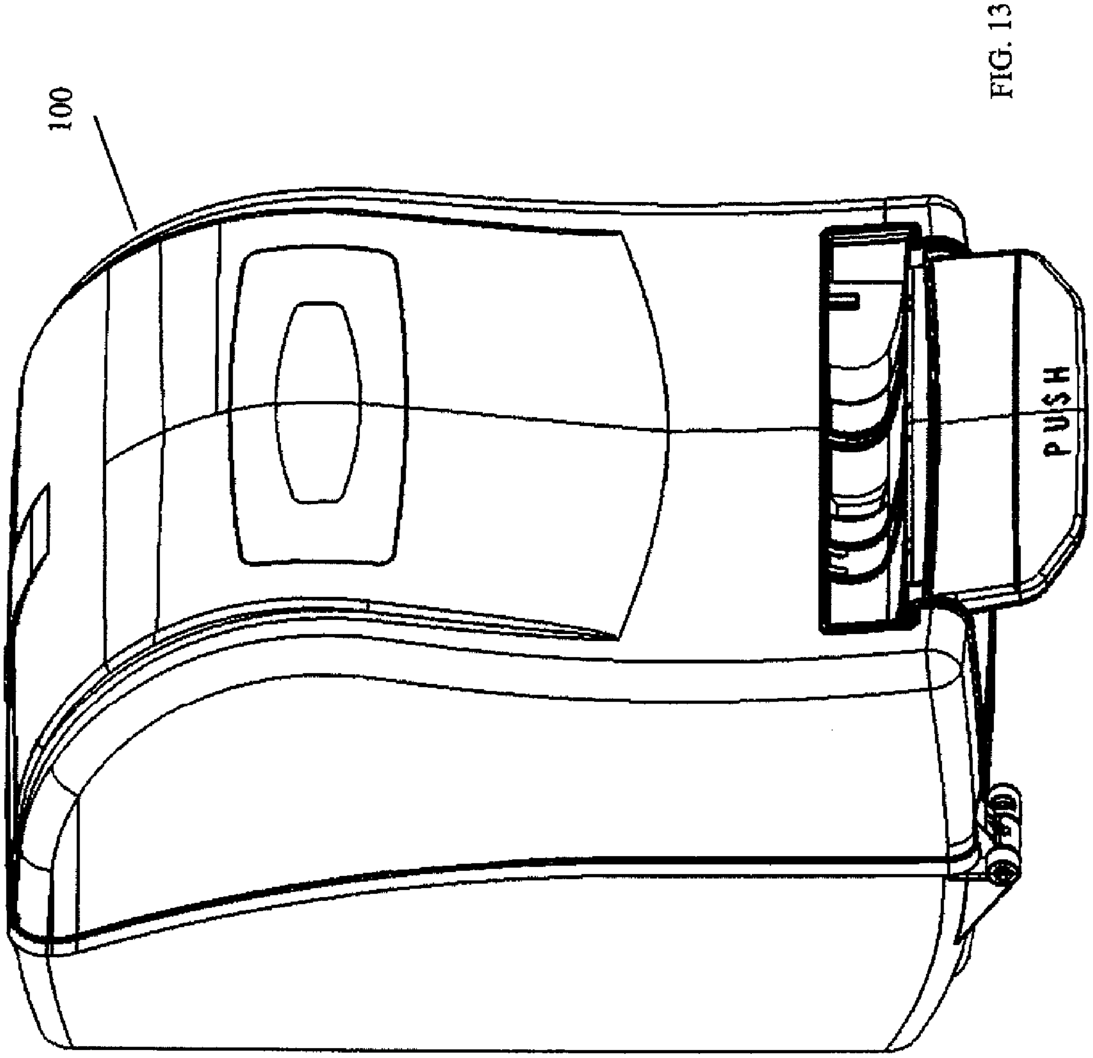
FIG. 13 is a perspective view of a hands-free paper towel dispenser according to a second embodiment of the invention.
Figure 14:
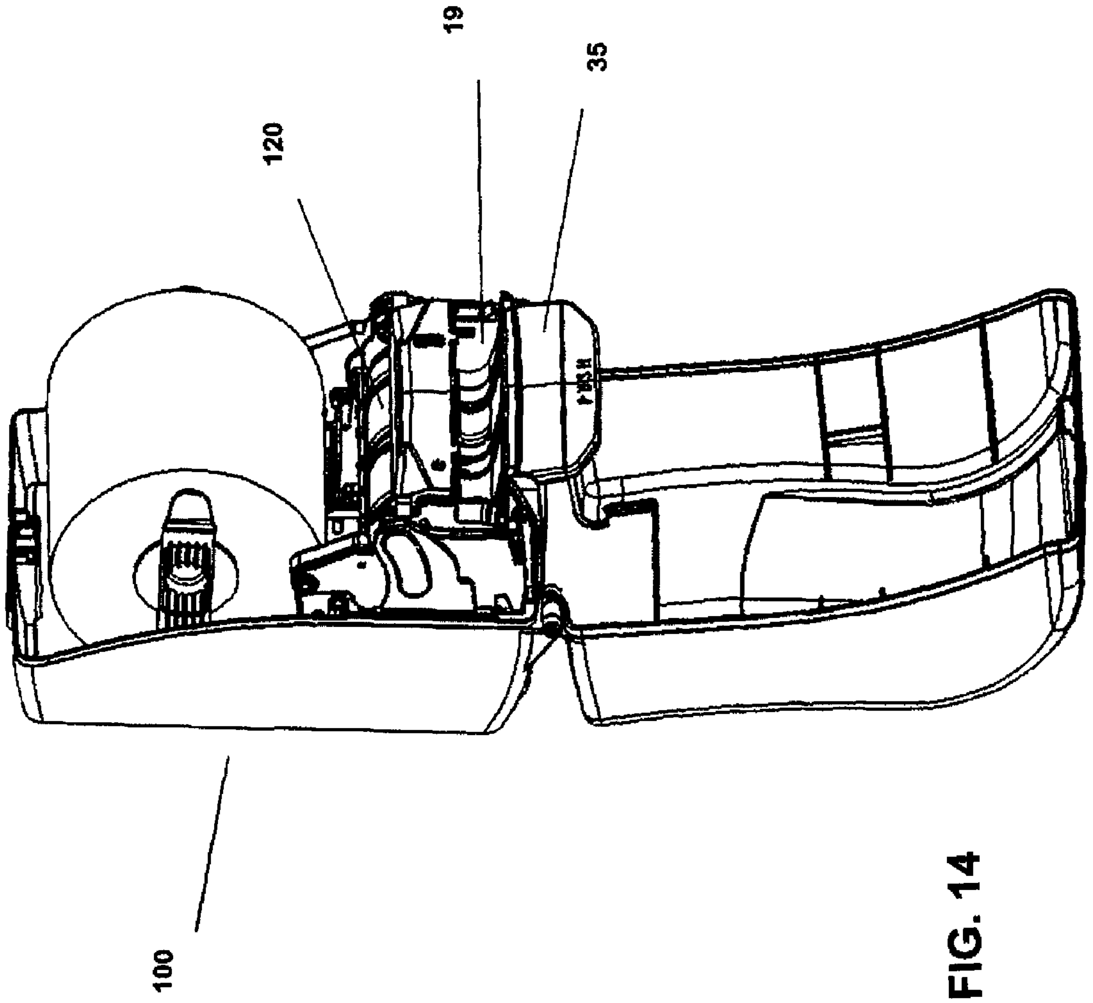
FIG. 14 is a perspective view of the dispenser shown in FIG. 13 with its front housing opened.
Figure 15:
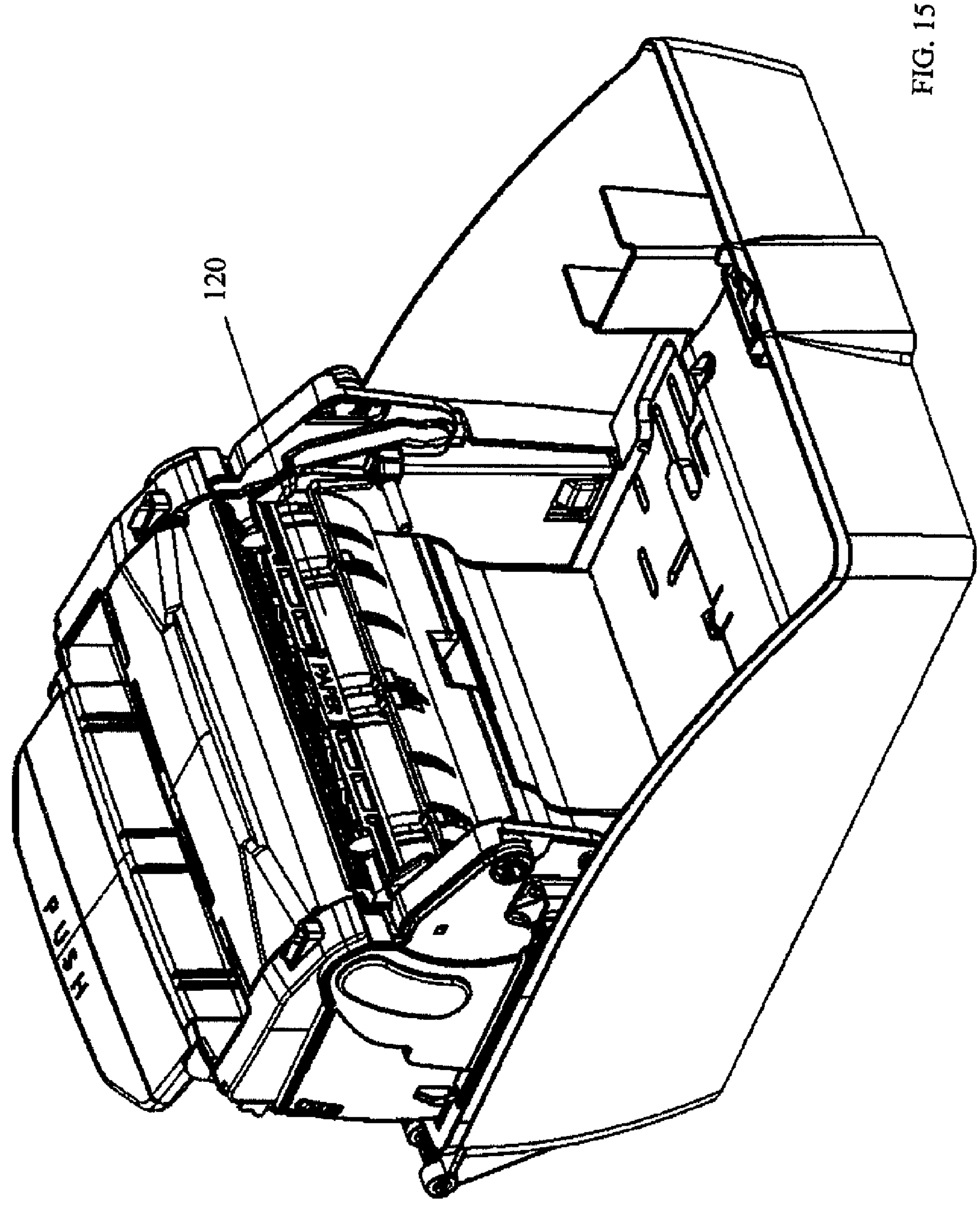
FIG. 15 is a perspective, partially disassembled view of the dispenser shown in FIG. 13, illustrating a back housing and internal components in assembled form.

Referring to FIG. 12, the motor 60 is one component of an automatic dispensing assembly that enables the dispenser 10 to automatically dispenser paper towel segments to the user. These components include the motor 60, a DC power supply 80, a motor power control circuit 82, a user detection sensor 84, a door open disconnect switch 86, and a motor off signal switch 88.

The DC power supply 80 is electrically coupled to the motor 60 by the door open disconnect switch 86 and the control circuit 82. In this embodiment, the DC power supply 80 is a battery pack comprising eight D-Cell batteries. Alternatively or additionally (but not shown), the DC power supply 80 can be an inverter that connects to an AC power source, e.g. a building's AC power outlet. The inverter converts the AC power into DC for use by the motor 60. The door open disconnect switch 86 is located on the dispenser 10 such that the switch 86 opens when the door 12 is opened. This prevents the motor 60 from operating the cutting drum 20 and causing injury when the dispenser 10 is being serviced.

The control circuit 82 includes a programmable logic controller (PLC) programmed to control the automatic dispensing operation of the dispenser 10. The control circuit 82 is electrically coupled and communicative with the user detection sensor 84, the motor 60, the power supply 80 via door open disconnect switch 86, and the motor off switch 88. The motor off switch 80 is also communicative with the motor 60. The sensor 84 can be any type of sensor that detects the presence of the user, and can for example be a proximity sensor such as an IC digital capacitance sensor, a motion sensor, or an infrared sensor such as a pyroelectric sensor that detects the user's body heat. The sensor 84 is powered by the battery 80 via the control circuit 82. When the sensor 84 detects the user, it sends a user detected signal to the control circuit 82. The PLC of the control circuit 82 is programmed to check the sensor 84 and when detecting the user detected signal, to send a motor actuation signal to the motor 60. In response to the motor actuation signal, the motor 60 activates and rotates the cutting drum 20. When the cutting drum 20 reaches the top dead center position, the motor off switch 88 is triggered and sends a stop motor signal to the control circuit 82; triggering the motor switch 88 at top dead center can be accomplished in a variety of ways known in the art, e.g. by placing a contact on the drum 20 such that the contact triggers the switch 88 at the top dead center position. When the control circuit 82 receives the stop motor signal, the PLC is programmed to stop the motor 60 by terminating the motor actuation signal. As described above, the spring 32 is loaded when the cutting drum 20 reaches the top dead center position, and will release its stored energy to advance the cutting drum through the rest of the revolution and back to the start position. The PLC is programmed to wait for a selected period of time before checking the sensor 84 again; this wait period provides the user with enough time to obtain the dispensed towel segment and leave the vicinity of the dispenser 10.

The cutting operation performed by the cutting drum 20 through one revolution is now described in detail, and in reference again to FIGS. 6(*a*) and (*b*). The paper roll is mounted in the roll holders 16, and the leading edge of the paper roll is fed over the top pinch roller 50, into the space in between the cutting drum 20 and the paper guide 52, past the bottom pinch roller 50, and out of slot 19. The cutting drum 20 is in a start position wherein the cutting knife 44 is retracted and in approximately the 0 degree position inside cutting drum 20. When a user pulls on the leading edge of the paper roll or presses the manual advance assembly, or the motor 60 rotates the cutting drum 20, the paper roll will rotate as paper is dispensed. The pinch rollers 50 keep the paper taut against the rolling surface 21; movement of the paper causes the cutting drum 20 to rotate, or, rotation of the drum 20 pulls paper through the roller assembly 18. As the cutting drum 20 rotates clockwise in FIGS. 6(*a*) and 6(*b*), the knife actuator 40 travels through the cam path and causes the knife holder 42 to pivot and the knife 44 to extend out of the rolling surface 21. When the cutting drum 21 reaches the position shown in FIG. 6(*b*), the knife 44 is fully extended and punctures the paper. The paper is severed, and a paper towel segment is dispensed through the slot 19. At the position shown in FIG. 6(*b*), the return spring 32 has passed top-dead-center, and releases its energy, rotating the cutting drum 20 back into its start position, and advancing the leading edge of the paper through the slot 19.

When the dispenser is dispensing paper towel segments in automatic dispensing mode, the user can still manually operate the dispenser in either hands-free or hands-on manual dispensing mode. This may be desirable when the user wishes to obtain paper at a rate that faster than the rate at which paper towel segments are dispensed in automatic dispensing mode. The one way bearing enables the user to manually advance the cutting drum 20 at a faster rate than the rotational rate provided by the motor 60. When the cutting drum reaches top dead center position, either by the motor or by the user, the motor off switch 88 will be triggered, and the control circuit 82 will stop operation of the motor 60. Similarly, the one-way bearing enables the user to rotate the cutting drum 20 when the motor 60 is not operating.

Referring now to FIGS. 13-18 and according to a second embodiment of the invention, a motorized hands-free paper towel dispenser 100 is provided that automatically advances a selected length of towel sheet from the dispenser. A user manually tears the towel sheet length from the towel roll. This dispenser 100 differs primarily from the dispenser 10 of the first embodiment by utilizing a roller drum 120 instead of the cutting drum 20, and including a row of cutting teeth 130 at the paper dispensing slot 19.

The roller drum 120 has a sufficient coefficient of friction that the towel sheet applied thereon will be advanced through the dispenser 100 when the roller drum 120 rotates. The components for feeding the towel sheet to the roller drum 120 and out of the dispenser 100 are substantially the same as in the first embodiment of the dispenser 10. Since the roller drum does not contain any cutting mechanism, the paper is dispensed uncut through the paper dispensing slot 19. The control circuit 82 is programmed so that the motor 60 advances the towel sheet an appropriate length for a user's use; such length can be adjusted depending on the operator's preference.

As there is no retractable cutting knife 44, the roller drum 120 is not connected to a return spring 32, and there is no cam path in the roller assembly 18.

The cutting teeth 130 are located sufficiently deep inside the paper dispensing slot that it is difficult for a user to inadvertently injure himself when using the dispenser 100. When the motor 60 advances a portion of the towel sheet out of the dispenser, the user can tear a towel segment from the towel sheet using the cutting teeth 130.

Figure 16:
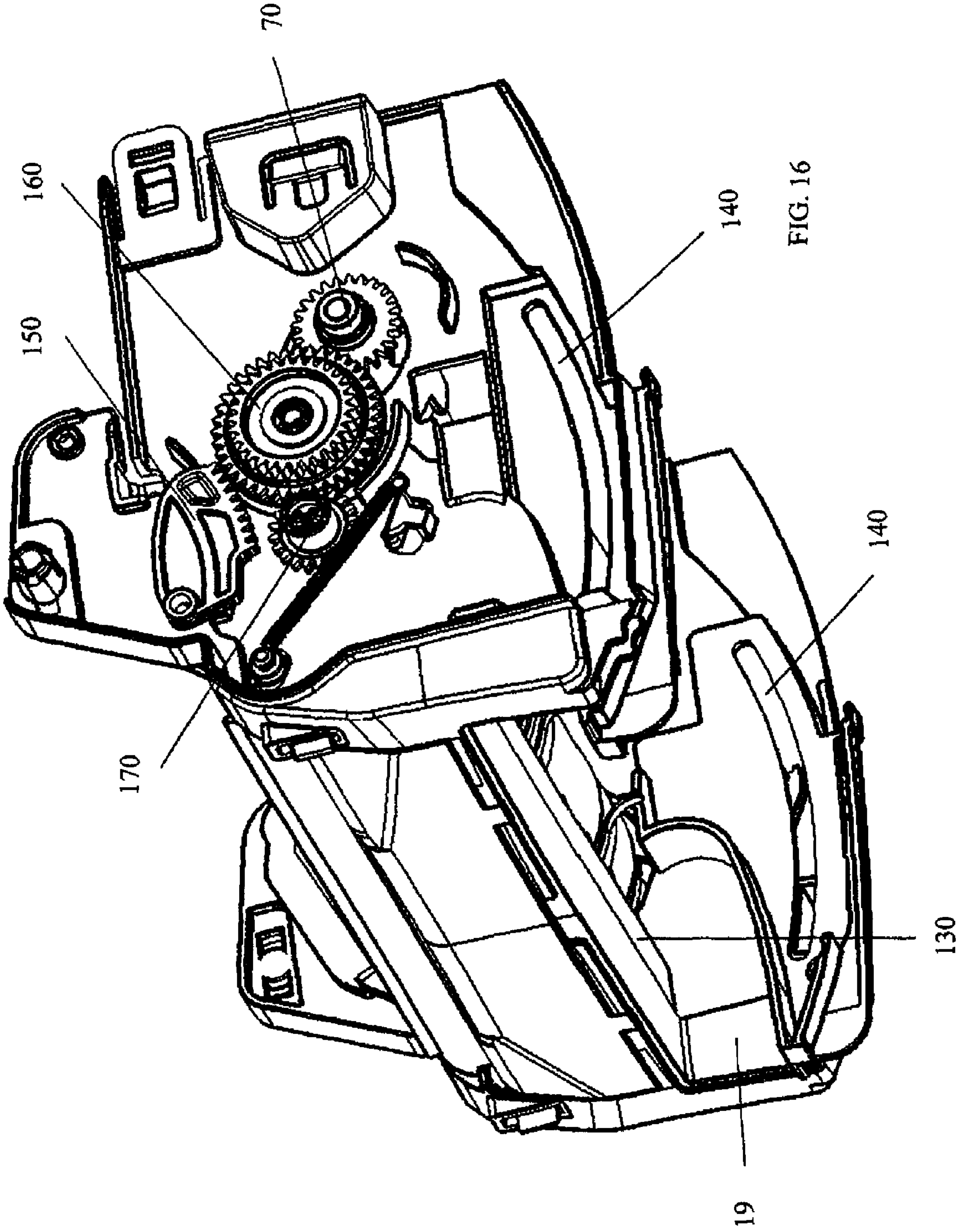
FIGS. 16-18 are perspective, partially disassembled views of the dispenser shown in FIG. 13, illustrating some of the internal components of the dispenser.

Referring particularly to FIG. 16, right and left guides 140 are shown which receives the right and left manual advance levers (not shown). These levers are connected to a floating ratchet 150 and to a push button (not shown). The floating ratchet 150 engages a set of teeth on an intermediate drive gear 160. The intermediate drive gear 160 rotatably couples the motor drum drive gear 70 to a roller drum drive gear 170. When the push button is pushed, the manual advance levers slide inwards along the guides 140, and move the ratchet 150 such that the intermediate drive gear 160 is rotated clockwise as shown in FIG. 16 (drive direction). When the push button is returned back to its start position, the ratchet 150 disengages from the intermediate drive gear 160, in a manner that is well known in the art.

Figure 17:
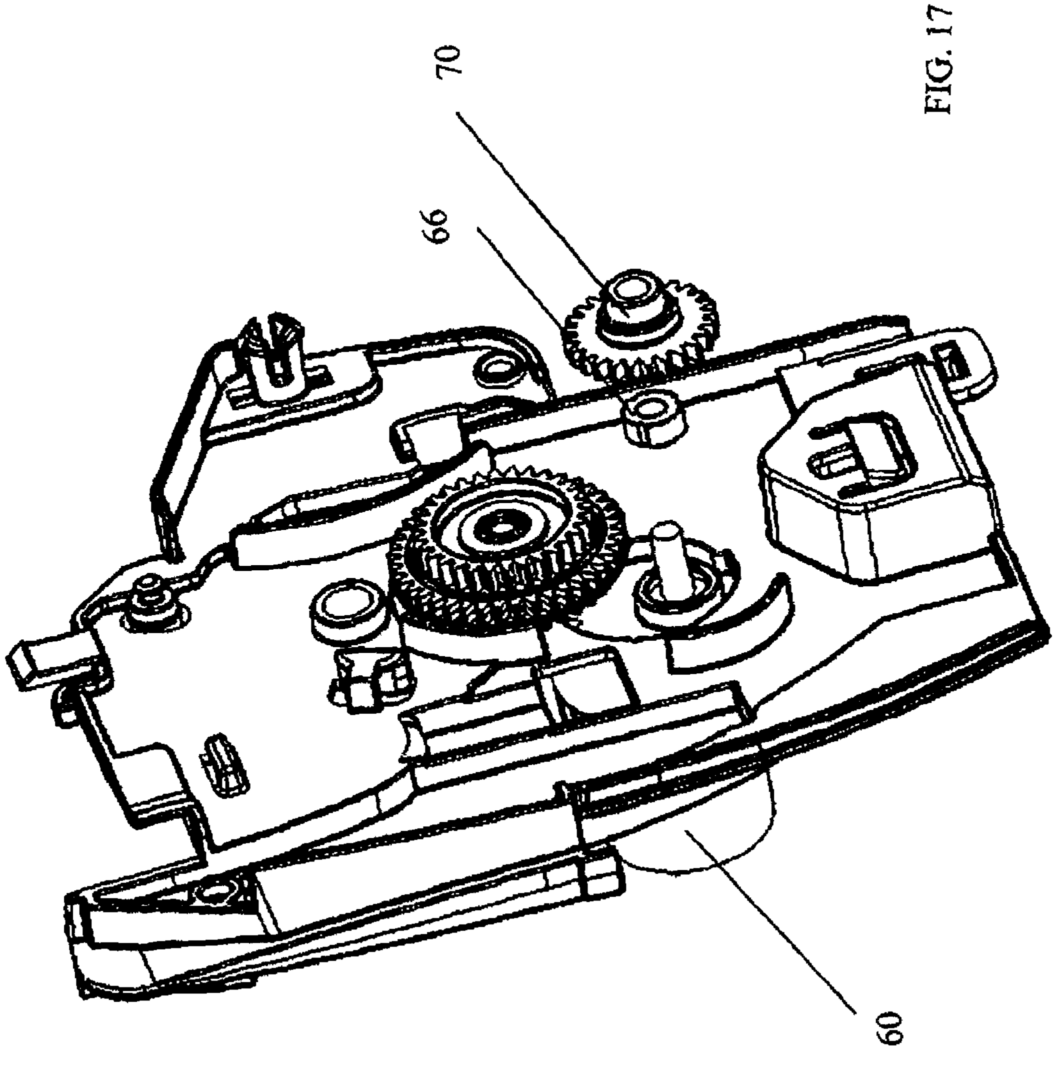
Figure 18:
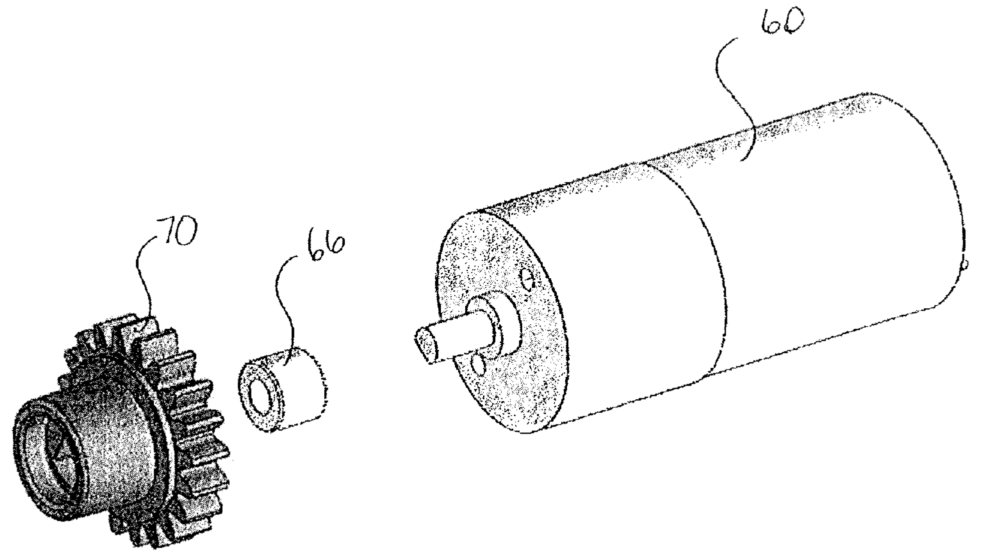

Like the first embodiment of the dispenser and referring particularly to FIG. 17, the motor drive gear 70 is provided with a one-way bearing 66 that enables the motor 60 to drive the motor drive gear 70 in the drive direction, and allows the motor drive gear 70 to rotate freely in the opposite (counter clockwise) direction relative to the motor drive shaft. This enables the roller drum 120 to be rotated by the push button even when the motor 60 is not operating, or allow paper to be advanced by the push button at a faster rate than being advanced by the motor 60.

While the present invention has been described herein by some embodiments, it will be understood to those skilled in the art that various changes may be made and added to the invention. The changes and alternatives are considered within the spirit and scope of the present invention.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A paper towel dispenser comprising a pinch roller;

a rotatable drum that advances a paper towel sheet when the paper towel sheet is between the inch roller and the drum and in frictional contact with the drum and when the drum rotates;

a gear assembly comprising at least one toothed member;

a motor coupled to the drum by the gear assembly and automatically operable to rotate the drum in an advancing direction when a motor shaft of the motor rotates in a first direction, such that the paper towel is dispensed during operation of the motor;

a manual advance assembly mechanically coupled to the drum and having a user interface that is manually movable by a user to rotate the drum in the advancing direction; a one one-way coupling coupling the motor shaft and the toothed member, the one one-way coupling is arranged to transfer rotational movement from the motor shaft to the toothed member when the motor shaft rotates in the first direction such that the drum is driven in the advancing direction, the one one-way coupling allows the drum to be driven in the advancing direction by the manual advance assembly without rotating the motor shaft while the toothed member rotates, and the one one-way coupling allows the drum to be driven in the advancing direction by a user pulling on the paper towel sheet without rotating the motor shaft while the toothed member rotates; and a means for connecting the user interface to the drum such that movement of the user interface in a first direction results in advancement of the drum and movement of the user interface in a second direction, opposite the first direction, does not result in rotation of the drum.

2. A paper towel dispenser as claimed in claim 1 further comprising a housing which houses the drum, the motor, the at least one one-way coupling and a portion of the manual advance assembly which is coupled to the drum.

3. A paper towel dispenser as claimed in claim 1 further comprising a housing which houses the drum, motor, the at least one one-way coupling and a portion of the manual advance assembly which is coupled to the drum, and wherein the manual advance assembly further comprises a rotary dial portion extending outside of the housing and which can be rotated by the user to rotate the drum.

4. A paper towel dispenser as claimed in claim 1 wherein the at least one one-way coupling comprises a one-way bearing.

5. A paper towel dispenser as claimed in claim 1 wherein the at least one one-way coupling comprises a one-way clutch.

6. A paper towel dispenser as claimed in claim 1 wherein the at least one one-way coupling comprises a one-way ratchet.

7. A paper towel dispenser as claimed in claim 1 further comprising means for severing a portion of the sheet advanced by the rotation of the drum such that the sheet portion is dispensed.

8. A paper towel dispenser as claimed in claim 7 further comprising a housing having a paper dispensing slot, and wherein the housing houses the drum, motor, the at least one one-way coupling, a portion of the manual advance assembly which is coupled to the drum, and the means for severing, and wherein the means for severing is located inside the housing between the paper dispensing slot and the drum.

9. A paper towel dispenser as claimed in claim 8 wherein the means for severing are cutting teeth provided at the paper dispensing slot.

10. A paper towel dispenser as claimed in claim 1 further comprising a user detection sensor, and a control circuit communicative with the motor and the user detection sensor and programmed to automatically operate the motor when a user detected signal is received from the sensor.

11. A paper towel dispenser as claimed in claim 10 wherein the user detection sensor is selected from the group consisting of an integrated circuit digital capacitance sensor, a motion sensor, and an infrared sensor.

12. A paper towel dispenser as claimed in claim 10 wherein the user detection sensor is a pyroelectric infrared sensor configured to detect the user's body heat.

13. A paper towel dispenser as claimed in claim 1, wherein the motor is capable of advancing the paper towel at a motorized dispensing speed, and the at least one one-way coupling enables the user to pull on the paper towel to advance the paper towel at a manual speed that is faster than the motorized dispensing speed independent of operation of the motor.

14. A paper towel dispenser as claimed in claim 1, wherein a push button of the manual advance assembly is connected to at least one advance lever engageable with teeth of an end cap coupled to the a drum drive gear by the means for connecting the user interface to the drum.

15. A paper towel dispenser as claimed in claim 1 wherein the gear assembly includes a motor drive gear, a drive gear, and a drum drive gear, the motor drive gear is coupled to the motor shaft, the drive gear has teeth enmeshed with teeth of the motor drive gear and teeth enmeshed with teeth of the drum drive gear.

16. A paper towel dispenser as claimed in claim 1, wherein the means for connecting comprises a floating ratchet member coupled to the user interface and engageable with a roller drum drive gear.

* * * * *